Nov. 6, 1951 H. P. BOSWAU 2,573,889

AUTOMATIC TELEPHONE SWITCHING MECHANISM

Filed Dec. 14, 1948 6 Sheets-Sheet 1

INVENTOR.
Hans P. Boswau
BY
Atty.

AUTOMATIC TELEPHONE SWITCHING MECHANISM

Filed Dec. 14, 1948 6 Sheets-Sheet 2

INVENTOR.
Hans P. Boswau
BY
Atty.

AUTOMATIC TELEPHONE SWITCHING MECHANISM

Filed Dec. 14, 1948 6 Sheets-Sheet 3

INVENTOR.
Hans P. Boswau
BY
Atty

INVENTOR.
Hans P. Boswau
BY
Atty.

AUTOMATIC TELEPHONE SWITCHING MECHANISM

Filed Dec. 14, 1948 6 Sheets-Sheet 5

INVENTOR.
Hans P. Boswau
BY
Atty.

Nov. 6, 1951 H. P. BOSWAU 2,573,889

AUTOMATIC TELEPHONE SWITCHING MECHANISM

Filed Dec. 14, 1948 6 Sheets-Sheet 6

INVENTOR.
Hans P. Boswau
BY
Atty.

Patented Nov. 6, 1951

2,573,889

UNITED STATES PATENT OFFICE 2,573,889

AUTOMATIC TELEPHONE SWITCHING MECHANISM

Hans P. Boswau, Dundee, Ill.

Application December 14, 1948, Serial No. 65,218

14 Claims. (Cl. 179—27.54)

This invention relates to automatic telephone systems, and is particularly concerned with improved switching devices and apparatus for use, for example, in systems of the type disclosed in U. S. Patents Nos. 2,307,757, 2,396,077, 2,509,416, and 2,485,986, and especially for use in a system as described in co-pending application Ser. No. 166,624, filed June 7, 1950, which is a division of the present disclosure.

The apparatus described in the above noted patents is of a special type which has been referred to, for the sake of convenience, as a type of coordinate or crossbar switching apparatus. With the improvements disclosed in the present application, when used as described in the co-pending application Ser. No. 166,624, the apparatus may also be referred to as a type of relay switching apparatus which combines the virtues of relay systems with those of crossbar or coordinate types of systems. It is understood, therefore, that designations such as "crossbar type switch or system" or "coordinate type switch or system" or "relay switch or system" may be interchangeably applied to the new apparatus.

Some of the specific objects of the invention may be briefly summarized as follows:

1. One object is to provide a switch of the relay, crossbar or coordinate type comprising means for removably supporting conductors forming a line bank multiple representing terminals of subscribers' lines each having three or more conductors.

2. Another object is to provide a switch of this class comprising conductors arranged in a plurality of "tens" sub-groups extending in one coordinate direction, a tens actuator associated with each sub-group, actuating means disposed at one end of the switch for operating some of said tens actuators, and actuating means disposed at the opposite end of said switch for operating others of said tens actuators.

3. A further object is to provide a switch of the character described comprising tens and units actuators, relay means for operating each actuator, and holding contact means operated by each relay means.

4. Still another object is to provide a switch as described, comprising removably mounted conductors forming a line bank multiple representing subscribers' lines each associated with a set of conductors in said line bank multiple, conductors forming a switch bus, tens and units actuators for selectively connecting any of said sets of removable conductors with the conductors of said switch bus, individual magnet means for operating each of said tens and units actuators, removably mounted conductors forming an allotter bank multiple, a separate actuator for said allotter bank multiple, and contact means operated by said separate actuator for connecting said individual magnet means with predetermined conductors of said allotter bank multiple.

5. Another object of the invention is to provide a switch of the class described, which comprises sets of conductors forming a line bank multiple, conductors forming a switch bus, tens and units actuators for connecting any set of conductors in said line bank multiple with corresponding conductors of said switch bus, individual magnet means for said tens and units actuators, conductors forming an allotter bank multiple, an allotter actuator, and contact means controlled by said allotter actuator for simultaneously connecting a predetermined tens and a predetermined units magnet to predetermined conductors of said allotter bank multiple.

6. A further object is to provide a switch of the character described, which may be interchangeably operated as a finder or as a connector.

7. Another object is to provide a switching mechanism comprising a plurality of like switches disposed side by side, said switches being arranged in pairs, each pair comprising a finder and a connector.

8. It is still another object of the invention to provide a plurality of switches side by side to form a switching mechanism, each switch forming means for receiving a plurality of conductors to form a bank multiple, and guide means disposed at one end of said group of switches for guiding the insertion of said conductors.

9. As a further object, the invention contemplates the provision of a switchboard having a mounting shelf for receiving a plurality of switches arranged therein side by side and interconnected by a plurality of removably disposed conductors forming a bank multiple therefor, and means for rotatably mounting said shelf to move the ends laterally thereof angularly with respect to the board so as to facilitate access to and manipulation of said conductors.

The objects noted in the foregoing statements and other objects and features will be described with reference to the accompanying drawings, in which.

Figure 1:
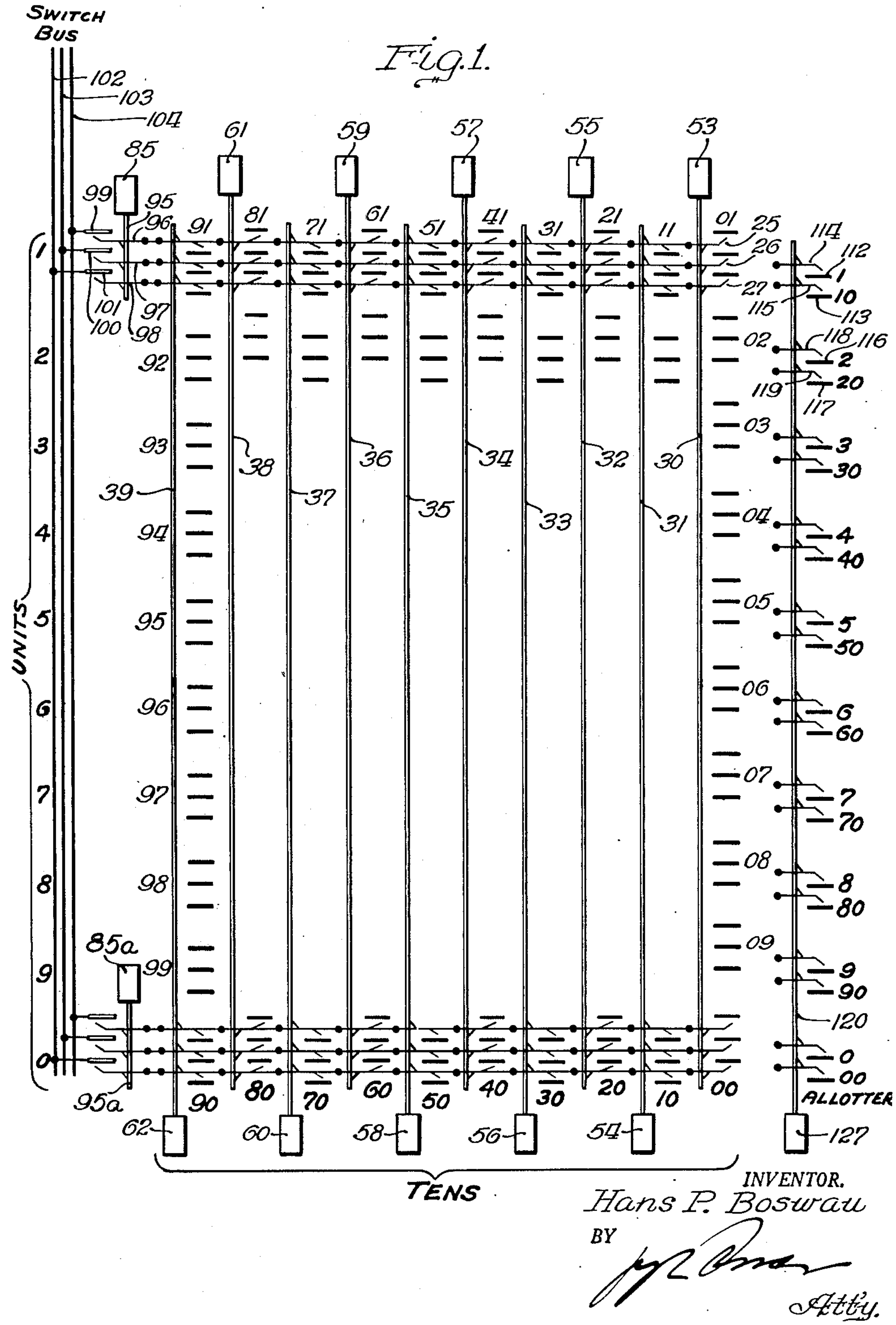
Fig. 1 is a diagrammatic representation of the new switch structure.

The new switch and switching mechanism will be discussed first with reference to the diagram shown in Fig. 1.

The switch is one of several switches which form the mechanism. It comprises means for supporting ten rows of conductor bars extending in parallel relation in one coordinate direction. As shown, these rows of conductor bars are disposed in vertical direction. Each row has ten sets of bars with three bars in each set. These rows of bars form the ten "tens" groups of conductors in the line bank multiple of the switch. Each bar extends serially through a number of switches disposed side by side. The bars are shown in the form of short, prominent lines in sets of three. Each set terminates in conductors which belong to the individual subscriber's equipment in the exchange. We thus have the ten tens groups of lines or bars, as indicated at the bottom of the diagram by prominent numerals 00—10—20—30, etc. to 90. The first tens group contains conductors of lines 01—00. The second tens group contains conductors of lines 11—10, and so forth, and the tenth group contains the conductors of lines 91—90. The numbering scheme may be different from the one shown.

The ten "tens" sub-groups thus form in the other coordinate direction, horizontally as shown in the drawing, ten vertically successively disposed "units" groups of conductor bars, each group comprising three rows of bars, ten in each row, as particularly indicated in connection with the top units row or group "1" and with the bottom units row or group "0." In the units group or row "1" we have the terminals of the lines 01—11—21—31, etc. to 91; in the units group "2" we have the terminals of the lines 02—92, and so forth; and in the units group "0" we have the terminals of the lines 00—90. These units groups are marked in prominent numerals at the left of the diagram. Only the bars for the units groups "1," "2" and "0" have been fully shown, while for the remaining units groups "3" to "8," the diagram indicates only the corresponding sets of bars in the two tens groups 00—01 and 90—91.

Each individual horizontal row of conductor bars is provided with a bank spring having ten individual contact fingers, one for each conductor bar in the row for making contact with such bar and thus connecting it with the bank spring. The bank spring associated with the topmost row of conductor bars in the units group "1" thus has individual contact fingers such as 25, one for each of the bars; the bank spring associated with the next lower row of bars in this units group has ten contact fingers such as 26, one for each bar in the row; and the bank spring associated with the bottom row of bars in this units group "1" is likewise provided with ten individual contact fingers such as 27, one for each bar in the row. The contact fingers of each bank spring are formed to point in alternately opposite directions.

Each and every units group is similarly equipped with three bank springs, one for each of its horizontally extending rows of conductor bars, and each bank spring has its ten individual contact fingers for connecting its associated bars with the corresponding bank spring. Only the top and bottom units groups "1" and "0" have been shown equipped with their bank springs.

Associated with each tens group of lines or bars 00—01 to 90—91 a "tens" actuator comprising a member extending, vertically as shown in the drawing alongside its corresponding tens group having projections or extensions for actuating the individual contact fingers such as 25, 26, 27 associated with each set of three conductor bars in the corresponding tens group. These ten tens actuators for the ten tens groups 00—01 to 90—91 are marked by numerals 30-39, inclusive. Each actuator is associated with a magnet, as indicated at 53—62. The magnets 53, 55, 57, 59 and 61 for the tens groups 00—01, 20—21, 40—41, 60—61 and 80—81, respectively, are adapted to actuate the actuator members 30, 32, 34, 36 and 38, respectively, upwardly as shown in the drawing, so as to operate the individual contact fingers associated with the conductor bars in the respective tens groups to make contact with such bars. In similar manner the magnets 54, 56, 58, 60 and 62 are provided for operating actuators 31, 33, 35, 37 and 39 associated with the tens groups 10—11, 30—31, 50—51, 70—71 and 90—91, respectively, downwardly as shown in the drawing, so as to operate the individual contact fingers in the respective tens group to make contact with their associated conductor bars.

Each bank spring is provided with an eleventh contact finger, as indicated at 96, 97, 98 in connection with the bank springs for the units group "1". A units actuator 95 is provided which is associated with a magnet or relay 85, and when this units magnet operates, it displaces its units actuator 95 to move the eleventh contact fingers 96, 97, 98 into engagement with fixed contact members 99, 100, 101 which are connected to the conductors 102, 103, 104 of the switch bus. The operation of such a units magnet thus connects the three bank springs of its associated units group with the conductors of the switch bus. Each remaining units group "2" to "0" is provided with its own units actuator 95 operating exactly like the units actuator associated with the units group "1". The units actuator for the units group "0" is indicated by numeral 95*a* and its associated units magnet by numeral 85*a*. Similar units actuators (not shown) and associated units magnets are provided for each of the units group "2" to "9". We thus have ten units actuators and associated magnets for the ten units groups "1" to "0". The fixed contacts such as 99, 100, 101 of the various units groups are multipled to the bus conductors 102, 103, 104.

Any one of the one hundred sets of bars in the line bank multiple, each set having three contact bars representing, for example, a subscriber's line, may be connected by the switch to the conductors of the switch bus. It is assumed in such operation that the switch operates in the nature of a finder. Assuming, for example, that line 01 is calling, the individual subscriber's line circuit will be "seized" by an idle finder which may be the one shown in Fig. 1, the seizure being accomplished by the operation of the tens actuator magnet 53 for the tens group 01 which operates the contact fingers 25, 26, 27 to engage the three conductor bars of the calling line 01, thus extending these bars to the left, through the medium of the three bank springs, to the eleventh contact fingers 96, 97, 98. Upon energization of the units magnet 85, the units actuator 95 is operated to cause the eleventh contact fingers 96, 97, 98 to make contact with the fixed terminals 99, 100, 101 of the switch bus. The line bars associated with the calling line "01" are now connected with the conductors 102, 103, 104 of the switch bus. Any one set of line bars associated with any one of the remaining subscribers' lines may be similarly connected with the conductors of the switch bus.

Circuit details for the operations indicated above and also for operations referred to in the following description may be had by consulting the co-pending application Ser. No. 166,624.

The finder, as noted before, is associated with a link relay circuit and with a connector which is structurally exactly like the finder. The called subscriber's line is "selected," in case of an outgoing call, in the same manner as the calling line is seized by the finder incident to an incoming call. Assuming, for example, that line 01 is calling line 90, the terminals of line 90 in the connector will be extended to the eleventh contact fingers in the units group "0," and units magnet 85*a* will then operate to actuate the units actuator 95*a* so as to connect the called line 90 with the terminals 102, 103, 104 of the switch bus, which lead to the link.

As shown at the right of the diagram, Fig. 1, there is also provided an allotter bank multiple comprising twenty individual conductor bars such as 112, 113, 116, 117 which may be disposed in pairs as shown. Associated with each of these conductor bars is an individual contact finger. Thus, there is the contact finger 114 for contact engagement with conductor bar 112, contact finger 115 for the conductor bar 113, contact finger 118 for conductor bar 116, and contact finger 119 for conductor bar 117. An allotter actuator 120 is provided which is structurally just like any of the tens actuators 30—39. The allotter actuator is provided with extensions or projections for simultaneously operating the contact fingers such as 114, 115, 118, 119, etc., into engagement with their associated allotter bars such as 112, 113, 116, 117. The allotter magnet is indicated at 127.

The ten allotter bars "1" to "0" are the units allotter bars and the ten allotter bars 10, 20, 30 etc. to 00 are the tens allotter bars. All these allotter bars are connected with the tens and units guard circuits, as described in detail in the co-pending application Ser No. 166,624, to aid in the selection of calling lines, that is, to aid in the operation of an idle finder, to connect with a calling line, and are also connected with the marker circuit to aid in the selection of a called line by the connector associated wwith the finder, the marker circuit interpreting the dial impulses delivered to the link circuit which is individual to the particular pair of finder-connector switches.

As will be presently shown, each of the tens magnets 53—62 and each of the units magnets 85–85*a* is provided with contact springs which are actuated upon operation of the respective tens and units magnets to furnish a holding circuit therefor.

The actual switch structure shown in Figs. 2–5 will be easily understood, bearing in mind the foregoing explanations given with reference to the diagram shown in Fig. 1.

Figure 2:
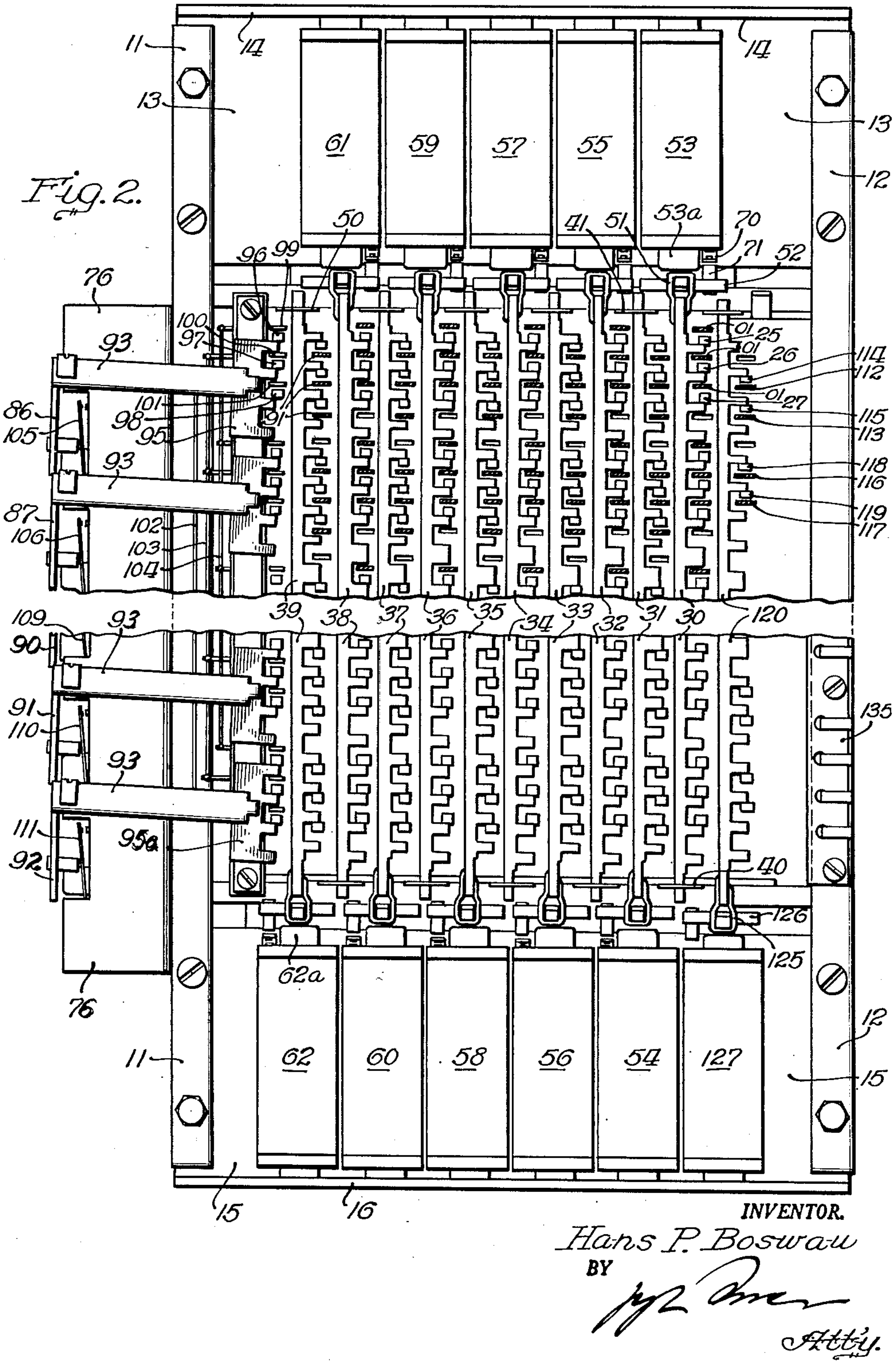
Fig. 2 shows the new switch in diagrammatic side view, as seen when looking in the direction of the arrow along line 2 in Fig. 6.
Figure 3:
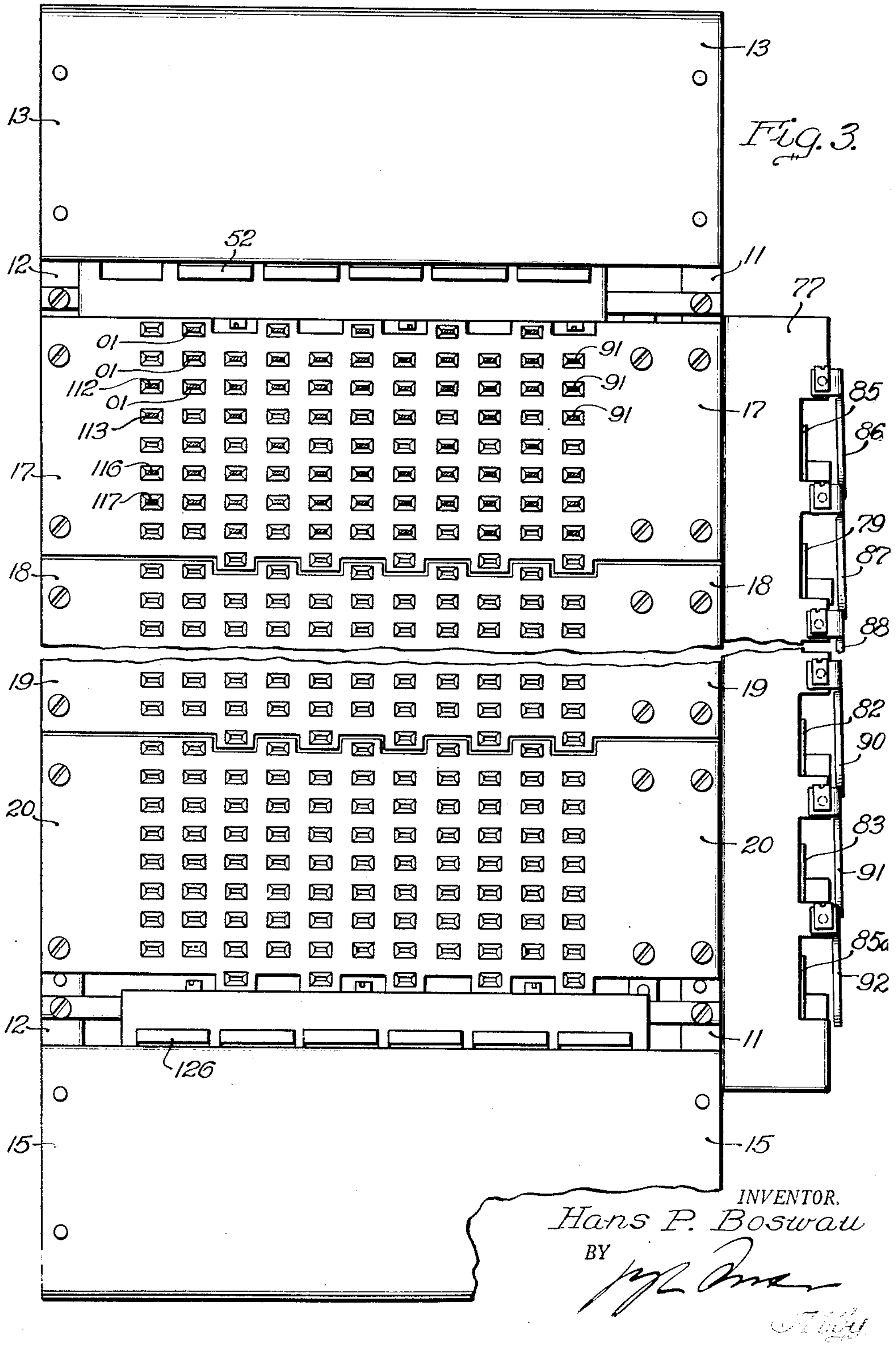
Fig. 3 illustrates the new switch from the opposite side, as seen when looking in the direction of the arrow along line 3 in Fig. 6.
Figures 4, 5:
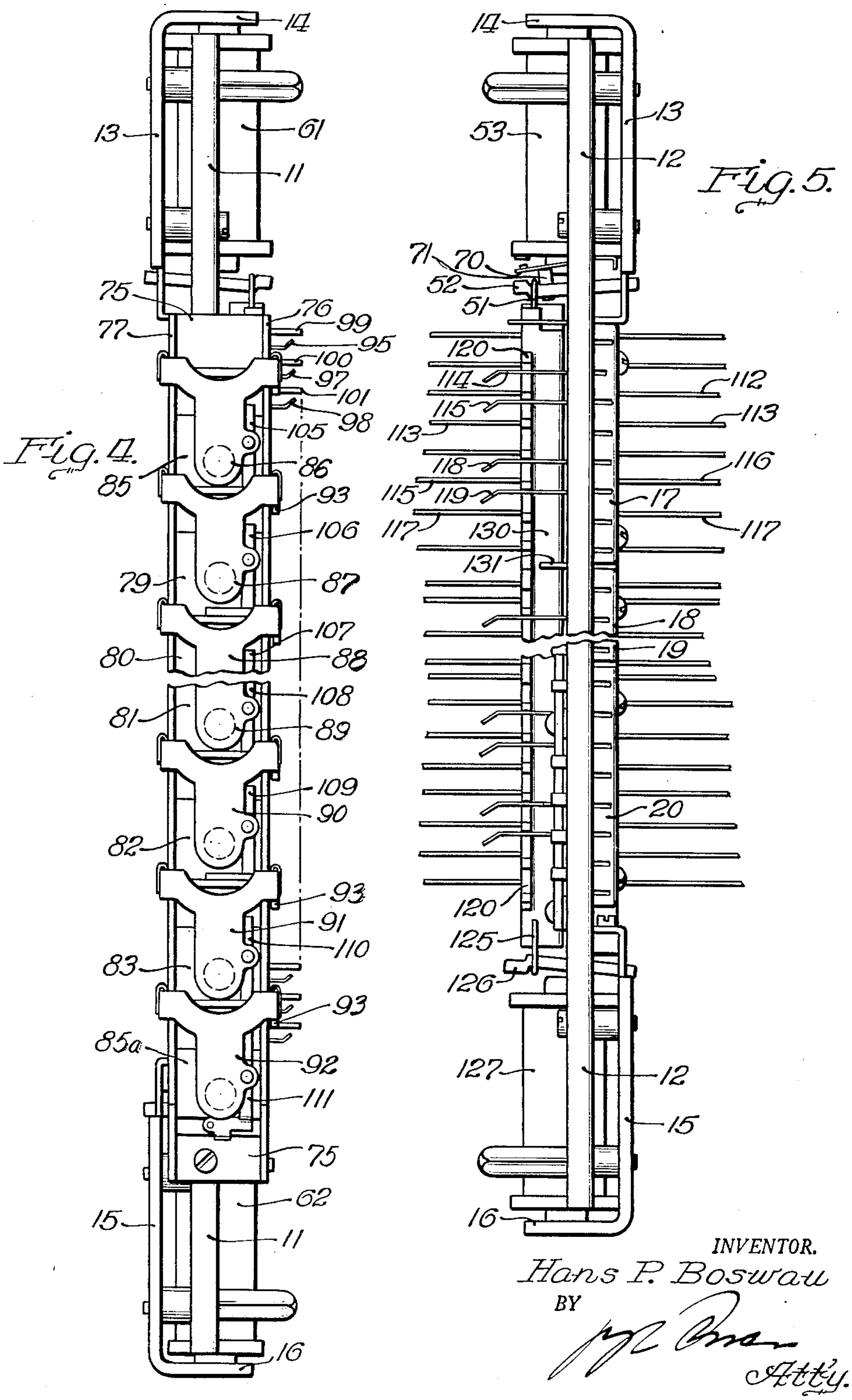
Figs. 4 and 5 are diagrammatic front and rear views of the switch.

As shown in Figs. 2–5, the switch comprises a generally rectangular frame formed by a pair of rail-like members 11—12 which are joined on top by an angular plate 13 forming a ledge 14 and at the bottom by an angular plate 15 forming the ledge 16. Secured to the rail members 11—12, as shown particularly in Figs. 3 and 5, are five plates of insulating material, for example, Bakelite. Only two of these plates are shown in full, marked 17 and 20, and two plates 18 and 19 are shown in fraction. Each plate is provided with eighty-eight holes disposed in eleven vertically extending parallel rows, eight holes in a row. When mounted on the rail members 11—12, as shown, these plates thus form eleven vertically extending parallel rows of holes with forty holes in each row, or a total of 440 holes. Supported in these holes are the conductors of the line bank multiple and, inasmuch as it is assumed that the subscribers' line circuits have three conductors, namely, two line and one test conductor, only three hundred holes would be required for the line bank multiple. The additional ten holes in each of ten vertical rows of the structure are provided in accordance with one object of the invention so as to adapt the switch for accommodating three hundred line multiple bars forming the terminals of one hundred lines each having three conductors, or, alternatively, four hundred line multiple bars forming the terminals of one hundred lines each having four conductors. The eleventh vertical row of holes accommodates the conductor bars for the allotter bank multiple, which is one of the new features of the invention.

The present structure is assumed for convenience to be provided in a system in which the subscriber's line equipment provides for three conductors. Accordingly, only thirty holes in each of ten vertically extending rows of holes are actually used for receiving the metallic conductor bars forming the line bank multiple. These bars are inserted through the corresponding holes in the insulating plates of a number of switches disposed side by side, the bars extending serially through all such switches. We thus have in the line bank multiple ten vertically disposed parallel rows of thirty bars to each row, each row containing the terminals of ten lines each having three conductors. These are the tens sub-groups of lines numbered 00—90 in Fig. 1.

The numbering scheme may be that already discussed in connection with Fig. 1, identical numerals in Figs. 2–5 referring to identical parts.

The bank springs associated with each horizontal row of line and test bars in each units group or level of the switch is a Phosphor bronze spring having ten individual contact fingers, one for making contact with each of the bars in the corresponding row. The structure of these bank springs with their contact fingers is similar to the one described in previously mentioned Patent 2,396,077. In the present case, however, the free ends of the contact fingers are formed to point in alternately different directions. Thus, the free end of the contact finger 25 for making contact with the topmost bar of line 01 points upwardly, as also shown in Fig. 1, in the direction of the topmost bar 01, and all vertically downwardly successive similar contact fingers also point upwardly in the direction of their associated contact bars. The contact fingers in the next tens group point downwardly, and the same scheme is repeated from tens group to tens group, the contact fingers pointing upwardly and alternately downwardly in the direction of their associated contact bars. The contact fingers associated with the line and test bars of the ten vertically extending tens groups have been omitted in Fig. 5 in order to avoid confusing the drawing. In Figs. 2 and 3, the line and test bars have been shown within the top portion of the multiple.

Each tens actuator 30—39 provided for the respective tens groups and also the allotter actuator 120 is an angularly shaped member made of a suitable insulating material having one edge serrated to form the extensions or projections for operating the various contact fingers, the other edge extending rearwardly as shown in connection with the allotter actuator 120 at 130 in Fig. 5, thus providing a structure which resists warping. A guide 131 (Fig. 5) is provided which is a striplike member extending transversely through the structure in back of the ten tens actuators and the allotter actuator, respectively. This guide has a serrated edge providing notches, one for each of the rearwardly directed edges such as 130 of each actuator to guide and support such actuator. A cross-sectionally U-shaped metallic member may be used for each tens actuator and for the allotter actuator, respectively, in place of the angular member, with holes in its base for the various contact fingers to be operated thereby, and carrying a similarly apertured insert of insulating material.

Each tens actuator 30—39 is mounted at one end in engagement with a spring member forming a snubber and an end guide therefore, as indicated in Fig. 2 at 40, and 41, being the snubber and guide members for the tens actuators 30 and 31, respectively. The allotter bar 120 at its upper free end is likewise associated with such a spring and snubber guide member, as indicated in Figs. 2 and 5. The spring snubber and guide member for the tens actuator 39 is indicated in Fig. 2 at 50. The snubber and guide member for the remaining tens actuators and for the allotter actuator are shown in Fig. 2 but are not marked by reference numerals. The opposite end of each tens actuator and also of the allotter actuator is pivotally associated, with the armature of its corresponding tens magnet 53—62 and of the allotter magnet 127, respectively, by means of a cliplike member such as indicated in Figs. 2 and 5 at 51 for the tens actuator 30 and at 125 for the allotter actuator 120. Thus the tens actuator 30 is provided with the cliplike member 51 which associates such actuator with the armature 52 of the tens magnet 53, being the operating magnet for the tens group 00 which contains the line and test bars belonging to lines 01 to 00. The tens actuator 31 is similarly associated with the tens magnet 54 serving the conductor bars of the tens group of lines containing the numbers 11 to 10. The remaining tens actuators 32—39 are in a similar manner associated with their corresponding tens magnets 54—62, respectively. The allotter actuator 120 is in like manner associated with the armature 126 of the allotter magnet 127.

It will be clear from the foregoing description that alternate tens actuators are operatively displaced in alternately different directions, as already described in connection with Fig. 1. The tens actuators 30, 32, 34, 36, 38 are operatively displaced upwardly by the tens magnets 53, 55, 57, 59 and 61, respectively, while the tens actuators 31, 33, 35, 37, 39 are operatively displaced downwardly by their tens magnets 54, 56, 58, 60 and 62, respectively. The allotter actuator 120 is displaced downwardly by the actuation of the allotter magnet 127.

The tens magnets 54, 56, 58, 60 and 62 and the allotter magnet 127 are mounted on the ledge 16 of the angular plate 15, while the tens magnets 53, 55, 57, 59 and 61 are mounted on the ledge 14 of the angular plate 13. Numeral 53*a* indicates the core of the tens magnet 53 coacting with the armature 52, and numeral 62*a* indicates the core of the tens magnet 62 which coacts with the corresponding armature associated with the tens actuator 39. The cores of the remaining tens magnets are unmarked.

As previously indicated in connection with the description of Fig. 1, each of the tens actuator magnets is provided with a contact which is closed by its associated armature upon energization thereof and consequently upon actuation of the associated tens actuator. Thus, as is particularly apparent from Figs. 2 and 5, the tens magnet 53 for the tens actuator 30 is provided with the contact spring 70 which is actuated by an insulating nipple 71 carried by the armature 52, and when the tens magnet 53 energizes it attracts its armature 52, displacing the tens actuator 30 and also flexing the contact spring 70 relative to a stationary contact, which is done for the purpose of closing a holding circuit to keep the magnet 53 energized. Each of the remaining tens magnets 54—62, as shown in Fig. 2, is provided with similar contact means for like purposes.

At the front of the switch, as particularly shown in Figs. 2 and 4, is provided a cross-sectionally U-shaped channel member having the base 75 and the side walls 76—77. This member is suitably secured to the rail-like frame member 11. Within this channel member are mounted the ten units magnets, seven of which are indicated in Fig. 4 at 85, 79—83 and 85*a*. Each units magnet has an armature, as indicated at 86, 87, 88, 89, 90, 91. Each of these armatures has an arm 93 which projects angularly rearwardly, as indicated in Fig. 2 in connection with armatures 86, 87, 90 and 92, respectively. Each arm carries at its free end an insulating actuator member such as indicated in Fig. 2, in connection with the arms 93 of the top and bottom armatures 86 and 92, at 95 and 95*a* respectively, each insulating member having a number of projections for operatively actuating the associated eleventh contact fingers of the corresponding bank springs in the respective units groups. Thus the projection extending from the insulating actuator member 95 carried by the arm 93 of the armature 86 is adapted to actuate the three eleventh contact fingers 96, 97, 98 to make contact with the three stationary contact members 99, 100, 101 which in turn are connected with the multiple conductors 102, 103, 104 of the switch bus. Each set of eleventh contact fingers in each units group comprising three fingers is similarly operated into engagement with the associated stationary contacts which are multipled to the conductors of the switch bus, as already explained in connection with Fig. 1.

It will be observed that each of the units actuators such as shown in Fig. 2 at 95, 95*a* has four projections, while only three are utilized for actuating the three associated eleventh contact fingers of the corresponding bank springs. The fourth projection, which is not used in the present case, may be employed in structures serving subscribers' lines having four line and test conductors instead of three, as has been assumed in the present case.

Each of the units magnets is also provided with individual contact means which is operable by its armature upon attraction thereof. As shown in Figs. 2 and 4, the individual contacts thus associated with the units magnets 85, 79—83 and 85a are indicated at 105, 106, 107, 108, 109, 110 and 111. As in the case of the corresponding individual contacts of the tens magnets, these contacts are provided for the purpose of furnishing a holding circuit for the corresponding units magnets after it has been energized.

The conductors for the allotter bank multiple are accommodated in the eleventh vertical row of holes at the right end of the switch, as shown in Fig. 2, and at the left, as shown in Fig. 3. The insulating plates supporting the line bank multiple bars and the allotter bank bars are uniformly made, and thus in the eleventh vertical row we have forty holes, with only twenty utilized for accommodating the twenty allotter bars required in accordance with the explanations furnished in discussing Fig. 1. Each allotter bar is again a stainless steel bar just like the conductor bars for the line bank multiple, and each bar extends serially through a group of switches. The explanations given in discussing the diagram, Fig. 1, are believed to be sufficient for an understanding of the structure of the allotter bank multiple and its associated allotter actuator 120 operable by the allotter magnet 127, as shown in Figs. 2–5. The corresponding parts are marked in these figures exactly as they are marked in Fig. 1.

The new switch structure exhibits a number of novel features. The arrangement of some of the tens actuator magnets at one end of the switch and others at the other end is a space-seving device which permits use of more powerful magnets, one individual to each actuator, also contributing to circuit simplification. Common selection control equipment has been eliminated from the switch structure as such. The provision of the allotter bank multiple with its allotter springs and magnet also contributes to structural simplification of the new switch as compared with the prior structures. The provision of individual holding contacts, one for each tens and units magnet, contributes toward circuit simplification and reliability of operation. Only one switch structure need be provided to serve as a finder or as a connector, as may be required. The switch structure is standardized and, as has been said before, can accommodate a line bank multiple having sets of conductor bars, each set with three or four bars for use, respectively, with lines having three or four conductors.

Figure 6:
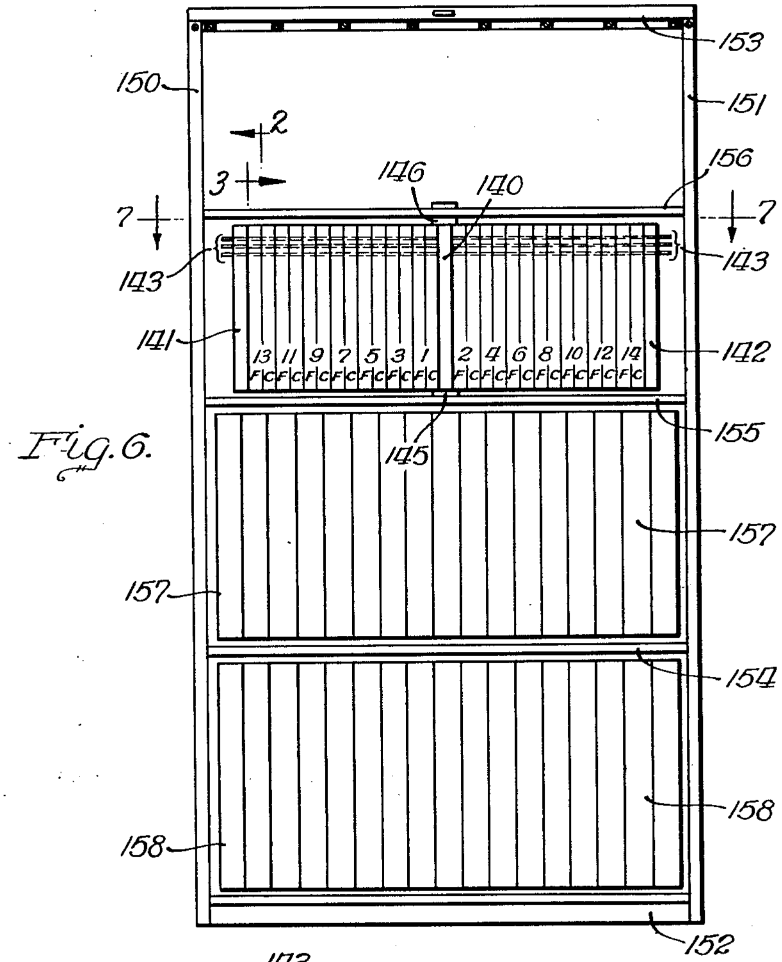
Fig. 6 is a diagrammatic representation of a switchboard.
Figure 7:
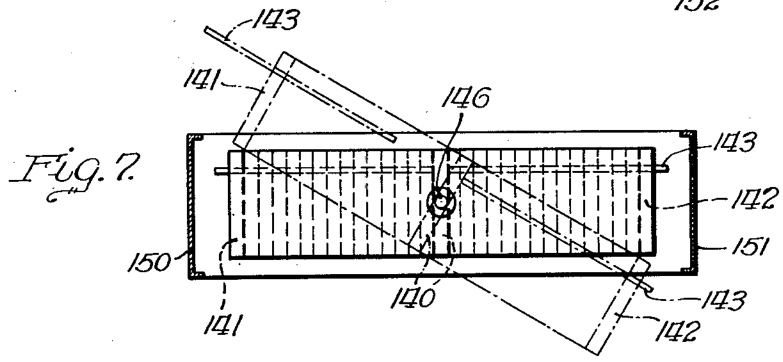
Fig. 7 is a diagrammatic sectional view of the switchboard taken approximately along line 7—7 of Fig. 6.

The use of a plurality of switches of the present invention, in pairs serving as finder-connector switches and associated relay and other equipment, all arranged on a board, is diagrammatically indicated in Figs. 6 and 7. The board is a suitable frame and sheet structures having two walls diagrammatically indicated at 150 and 151, the bottom 152 and the top 153. Within the board may be provided suitable cross and mounting members 154, 155, 156 which define the spaces for the various groups of apparatus.

The sets of relay and switching means for the finder-connector switches may be suitably disposed within the spaces defined by the rectangles 157 and 158, respectively. Each set of equipment is preferably provided with jack contacts and is jacked into corresponding jack terminals provided in the board.

The switches, each of which is provided with jack contacts as shown at the extreme right in Fig. 2 at 135, are removably arranged on a shelf side by side, each being jacked into corresponding jack terminals associated with the shelf. A group of the switches is disposed in the shelf on either side of the bank jack 140 which is described in Patent No. 2,485,986 and need not be further referred to at this place, except to state that it is a structure carrying an insulating plate provided on either side with jack terminals for receiving from each side the conductor bars forming the line bank multiple and the allotter multiple, respectively. At each end of the shelf is an end guide, as indicated at 141—142, which comprises an insulating plate having holes corresponding to the holes in the insulating plates in each switch for starting the insertion of the conductor bars through the group of switches until the free end of each bar engages its jack terminal in the bank jack 140. A group of three bars 143 is shown inserted through the end guide 141. The bars extend through all the switches at the left of the bank jack 140, the ends thereof terminating in the jack terminals therein. Three similar bars 143 are shown which are inserted from the right of the mechanism through the end guide 142 and are threaded through the holes in the insulating plates of the successive switches until their free ends are in engagement with corresponding jack terminals in the bank jack 140. There are three hundred line and test bars and twenty allotter bars extending into the switch structure from the left through the end guide 141 and three hundred twenty similar bars extending into the switch structure through the end guide 142. These bars being joined at the bank jack 140 thus divide the structure into two distinct groups each of which can be manipulated individually and both of which form the switching mechanism. In other words, the conductor bars of the line bank multiple and of the allotter bank multiple at the left of the bank jack 140 are conductively joined with corresponding conductor bars extending through the switches at the right of the bank jack 140. The arrangement simplifies addition and removal of switches for repair and other purposes, as pointed out in previously mentioned Patent No. 2,485,986.

There are in the switch shelf, as shown in Fig. 6, fourteen pairs of switches, numbered 1–14, each pair comprising a finder and a connector designated by "F" and "C," respectively. More or less may be provided, depending on the traffic that has to be handled. A second shelf of switches may be provided in the top space of the board, which is structurally just like the one discussed, serving the second hundred lines in a 200-line board.

The switch shelf is pivotally mounted at 145—146. It is thus possible to rotate the entire switching mechanism, with all its fourteen pairs of finder-connector switches, from the full-line position shown in Fig. 7 to the dotted-line position, to gain access to the individual switches. In this dotted line position, the line bank multiple bars as well as the allotter bars can be withdrawn from either end of the structure, as indicated in connection with the bar 143. If it is necessary, for example, to replace or repair a switch or to add switches to the mechanism, all of the bars forming the line bank multiple and the allotter bank multiple are withdrawn, whereupon any one of the switches can be removed by pulling it out forwardly from engagement with the associated jack. The mechanism is not put out of operation, as calls may be handled over the switches at the other side of the bank jack 140. The pivot points 145—146 are preferably rearwardly offset from the center line to avoid strain on the cable extending from the contacts of the bank jack.

While the operation of the new switch has been briefly explained in connection with the description of Fig. 1, it will aid in understanding the invention to discuss it a little more in detail with reference to Fig. 8.

The figure illustrates in a schematic manner two finders and two connectors of a 100-line system. For the sake of clarity, only nine of the one hundred lines are shown, and each is represented by a single conductor, although actually three or more conductors are of course provided in the switchboard for each line. The detailed functions of the finders and connectors are described in the co-pending application Ser. No. 166,624, and it will therefore be sufficient to say at this place that a connection is completed in the following steps: (1) a calling line automatically engages an idle finder and connector for the duration of the connection; (2) the finder controlled by the line relay of the calling line connects the calling line to the connector by way of a link relay circuit; (3) the calling party then dials the desired number which is received by the connector relays; and (4) the connector relays cause the connector to make connection with the called line, if idle.

Assuming that line 31 (Fig. 8) is calling and that finder 1 is seized for the call, the tens armature 30 in this finder is operated to connect the lines 30—39 to the bank springs of the switch, and units armature 1 is actuated to connect its bank spring fingers to the swtich bus conductors. The other nine bank spring sets remain open at their unoperated units armature contacts. Line 31 is now connected to the associated link relay circuit provided for the pair of switches, namely, the finder 1 and connector 1.

When the desired number is dialled, the connector relays in the link circuit function to cause operation of a tens armature and of a units armature in the connector. Assuming that No. 23 is dialled, the tens armature 20 functions to connect lines 20—29 to the bank springs of the connector, and units armature 3 connects its eleventh bank spring fingers to the terminals of the connector bus conductor, thus completing the connection from the finder through the connector and its relays to line 23. The other nine lines of the group 20—29 are kept open at the other units armature contacts.

Figure 8:
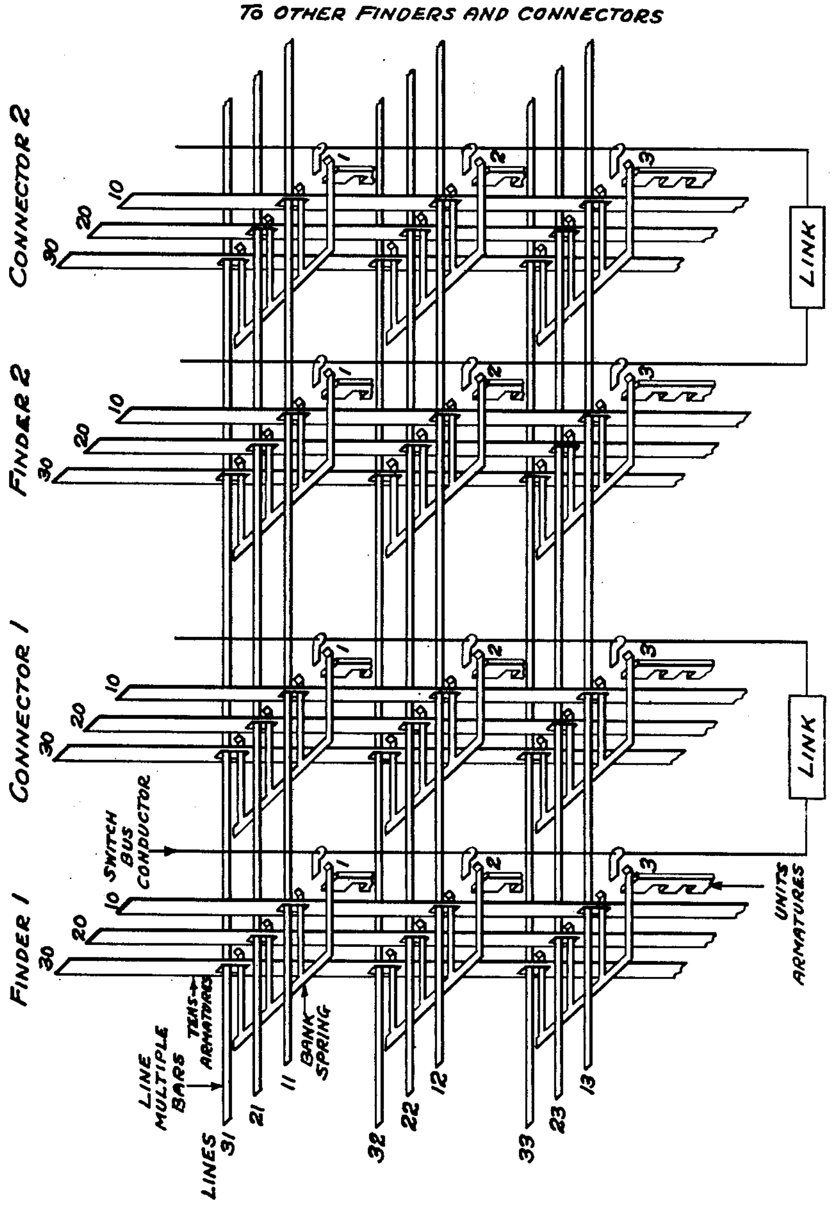
Fig. 8 is a diagram showing the basic selection scheme of the new system.

The completed connection may be traced from line 31 in the upper left hand corner of the diagram Fig. 8 following the horizontal multiple bar of this line to tens armature 30 of finder 1, then through the contacts closed by tens armature 30 and the bank spring fingers actuated by units armature 1 to the switch bus conductor through the link relay circuit and the connector bus conductor, to the bank spring finger actuated by units armature 3, and through the bank spring to its contacts closed by tens armature 20 and from there through the line bank multiple to line 23.

Another call may be set up over the pair of switches forming the finder 2 and the connector 2 while the first call is in progress, without in any way affecting the first call. The diagram illustrates only two finders and two connectors, the additional finders and connectors being in every respect the same as those shown. For clearness, all tens armatures in Fig. 8 are shown as operating upward; in the actual switch, as explained before, the alternate tens armatures operate in opposite direction.

The explanations so far deal with a 100-line system, but the same selection scheme may be applied to systems of any size. The 100-line group may be enlarged to two hundred lines by using two 100-line switches for each finder and connector. For still larger systems, one or more stages of switches, wired as selectors, may be interposed in well known manner between the finder and connector groups. Thus automatic telephone systems of any desired size may be built up.

What is believed to be new and desired to have protected by Letters Patent of the United States is pointed out in the accompanying claims.

I claim:

1. Switching apparatus of the class described, comprising conductors disposed in a plurality of tens sub-groups, means forming a tens actuator for each sub-group, individual relay means for operating each actuator, means for securing the relay means for some of said actuators at one end of said apparatus, and means for securing the relay means for other actuators at the opposite end thereof.

2. In a switch of the crossbar or coordinate type, means forming sets of rows of holes for supporting removable conductor bars arranged in sets of units groups representing the terminals of lines having identical units digits, a means forming units bank spring for each row, and means forming contact fingers extending from said bank springs, one for making contact with each conductor bar in each row, the free ends of said contact fingers being formed to point in alternately opposite directions.

3. The switch structure defined in claim 2, wherein alternate sets of holes in each set of rows are offset to support said removable conductor bars in staggered relationship.

4. A switch of the crossbar or coordinate type, comprising a frame, a plurality of insulating plates of like structure mounted in said frame, said plates having serrated edges each forming teeth for interlocking relationship with notches formed by the teeth in the serrated edge of an adjacent plate, and holes formed in the plates and in the teeth thereof forming parallel rows of apertures arranged in staggered relationship for receiving removable conductor bars forming a bank multiple for a plurality of switches, the conductor bars associated with each row of holes comprising sets of bars representing line terminals associated with lines having identical tens digits in their numbers and forming a tens subgroup of lines.

5. The switch structure defined in claim 4, together with means forming rows of contacts for each tens group of conductor bars, a tens actuator for operating the contacts in each tens group, and guide means for said tens actuators supported between the edges of two adjacent plates.

6. In an automatic telephone system, a plurality of sets of bare conductor bars disposed in tens and units groups to form a line bank multiple representing the terminals of lines, a plurality of bare conductor bars one for each tens and one for each units group of lines forming an allotter bank multiple, individual tens and individual units actuator means for each tens and for each units group of conductors in said line bank multiple, an operating magnet for each tens and for each units actuator, respectively, allotter actuator means for the conductors in said allotter bank multiple, and contact means operated by said allotter-actuator for individually connecting each tens and units operating magnet with a corresponding conductor in said allotter bank multiple.

7. A switching mechanism of the class described, comprising a plurality of switches arranged side by side, a plurality of sets of removable conductor bars extending serially through said switches in intersecting relationship therewith to form a bank multiple therefor, and guide means at one end of said mechanism for guiding the insertion and removal of said conductor bars.

8. A switching mechanism of the class described, comprising a shelf, a plurality of switches disposed in said shelf side by side, mounting means for said shelf, sets of removable conductor bars extending serially through said switches and forming a bank multiple therefor, and means for rotatably mounting said shelf to move the ends thereof laterally angularly with respect to said mounting means for the purpose of gaining access to said conductor bars so as to facilitate manipulation thereof relative to said switches.

9. A switching mechanism of the class described comprising means forming a shelf, means forming a jack disposed substantially midway of the ends of said shelf, said jack carrying terminals, a plurality of switches disposed side by side in said shelf on either side of said jack, mounting means for said shelf, sets of removable conductor bars extending serially through the switches on either side of said jack and forming a bank multiple for said switches, and pivot means for rotatably mounting said shelf to move the opposite ends thereof with respect to said mounting means for the purpose of gaining access to the conductor bars at either end thereof.

10. The structure defined in claim 9, wherein said pivot means is laterally offset from the center line of said shelf.

11. The structure defined in claim 9, together with guide means at either end of said shelf for guiding the manipulation of said conductor bars.

12. In a switching mechanism of the class described having a line multiple comprising a plurality of sets of bare conductors removably disposed in tens and units groups in intersecting relationship with a plurality of switches disposed side by side, a plurality of allotter bars removably disposed in a row in intersecting relationship with said switches alongside said line multiple, there being one allotter bar for each tens and one allotter bar for each units group of conductors in said line multiple, each switch comprising a tens actuator for each tens group, a units actuator for each units group, and an allotter actuator for said row of allotter bars.

13. The structure defined in claim 12, together with a magnet for operating each tens and units actuator, respectively, and holding contact means actuated by each such magnet.

14. In an electrical switching apparatus, means forming a relatively fixed frame having upright members and cross members to define an opening therein, switching mechanism disposed in said opening, said switching mechanism comprising means forming an elongated mounting, relatively fixed terminal means carried by said mounting approximately midway between the opposite ends thereof, a plurality of individual switching units removably disposed side by side on said mounting on either side of said relatively fixed terminal means, relatively movable terminal means for said switching units extending from either end of said switching mechanism inwardly toward said relatively fixed terminal means, and pivot means carried by said mounting approximately midway between the opposite ends thereof and coacting with journal means in one of said cross members for rotatably securing said mounting in said opening so as to permit angular displacement of said switching mechanism relative to said frame for the purpose of facilitating access to said relatively movable terminal means and to said individual switching units, respectively.

HANS P. BOSWAU.

REFERENCES CITED

The following references are of record in the file of this patent:

UNITED STATES PATENTS

| Number | Name | Date |
|---|---|---|
| 1,459,860 | Powell | June 26, 1923 |
| 1,492,995 | Lubberger | May 6, 1924 |
| 1,519,330 | Powell | Dec. 16, 1924 |
| 1,525,787 | Williams | Feb. 10, 1925 |
| 1,533,181 | Goodrum | Apr. 14, 1925 |
| 1,553,317 | Hinrichsen | Sept. 15, 1925 |
| 1,568,039 | Williams | Dec. 29, 1925 |
| 1,577,033 | Kerr | Mar. 16, 1926 |
| 1,593,387 | Clark | July 20, 1926 |
| 1,611,655 | Lomax | Dec. 21, 1926 |
| 1,623,769 | Williams | Apr. 5, 1927 |
| 1,844,147 | Clark | Feb. 9, 1932 |
| 1,872,720 | Flenley | Aug. 23, 1932 |
| 2,021,329 | Reynolds | Nov. 19, 1935 |
| 2,106,360 | Raymond | Jan. 25, 1938 |
| 2,137,503 | Obergfell | Nov. 22, 1938 |
| 2,137,514 | Voss | Nov. 22, 1938 |
| 2,214,907 | Lomax | Sept. 17, 1940 |
| 2,217,041 | Boswau | Oct. 8, 1940 |
| 2,279,531 | Saunders | Apr. 14, 1942 |
| 2,305,968 | Kiner | Dec. 22, 1942 |
| 2,307,757 | Boswau | Jan. 12, 1943 |
| 2,310,634 | Holden | Feb. 9, 1943 |
| 2,324,624 | Holden | July 20, 1943 |
| 2,333,039 | Peterson | Oct. 26, 1943 |
| 2,375,514 | Bakker | May 8, 1945 |
| 2,396,077 | Blackhall | Mar. 5, 1946 |
| 2,415,437 | McBerty | Feb. 11, 1947 |
| 2,433,256 | Baker | Dec. 23, 1947 |
| 2,435,025 | Baker | Jan. 27, 1948 |